United States Patent [19]

Potoroka

[11] Patent Number: 4,771,305
[45] Date of Patent: Sep. 13, 1988

[54] METHOD AND APPARATUS FOR COMMERCIAL PHOTOGRAPHY

[76] Inventor: Andrew J. Potoroka, P.O. Box 1262, Renton, Wash. 98057

[21] Appl. No.: 34,677

[22] Filed: Apr. 6, 1987

[51] Int. Cl.⁴ .............................................. G03B 15/06
[52] U.S. Cl. .................... 354/290; 296/24 R
[58] Field of Search ............... 354/75, 76, 290, 291, 354/81, 150; 352/132; 296/24 R, 171, 164, 168; 248/481

[56] References Cited

U.S. PATENT DOCUMENTS

| | | | |
|---|---|---|---|
| 1,355,408 | 10/1920 | Moody | 296/24 R |
| 3,609,014 | 9/1971 | Kurz, Jr. | 248/481 X |
| 3,776,120 | 12/1973 | Kraus | 354/290 |
| 4,072,973 | 2/1978 | Mayo | 354/290 X |
| 4,127,299 | 11/1978 | Blair | 296/164 |
| 4,181,347 | 1/1980 | Clark | 296/24 R X |

FOREIGN PATENT DOCUMENTS

Z 29721X/57a 12/1955 Fed. Rep. of Germany ........ 352/94
18345 of 1906 United Kingdom ............... 354/290

Primary Examiner—Michael L. Gellner
Assistant Examiner—Brian W. Brown
Attorney, Agent, or Firm—Walter Potoroka, Sr.

[57] ABSTRACT

A mobile photographic portrait studio apparatus, in a preferred ebodiment thereof, comprises a truck-drawn detachable studio trailer having functional studio areas therein for production line-type movement of studio customers and photograpic work in process, the trailer having a movable outer wall so that the natural environment outside the studio can be used as the portrait background, the studio having (a) adjustable mirror means for reflecting selected natural backgrounds to the studio camea and (b) various other features adapting the same for mobile studio functions of which a fixed studio is not capable, the object being to provide convenient and inexpensive photographic services at special sites, such as fairs, athletic events, scenic tourist sites and the like.

25 Claims, 3 Drawing Sheets

METHOD AND APPARATUS FOR COMMERCIAL PHOTOGRAPHY

BACKGROUND OF THE INVENTION

This invention relates generally to the art of photography, and more particularly to fast, low-cost commercial portrait and other specialized on-site photography.

Commercial portrait and other recreational and other on-site personal, family and other photography practices have, for a long time, and still do, involve considerable effort and expense.

For example, a personal or family portrait requires a trip to a commercial portrait studio, waiting several days or weeks for proofs and then waiting for the final costly prints, which involves additional substantial cost if the portraits are to be framed.

While many amateur photographers have and carry their own expensive equipment and supplies on vacations and elsewhere, many more people do not have, cannot afford or cannot operate equipment and supplies required to produce quality portraits or other photographs. Also, it is often the case that one does not have his camera equipment at the very time when it is desired to take a picture or portrait.

In the state of Washington, for example, there are hundreds of recreational and other indoor or outdoor functions (fairs, sporting events, etc.) that present opportunities for desirable family pictures to preserve the memory of attending the same. Even though the average amateur photographer may have brought his or her camera, there are many situations where a better quality and/or framed picture, or an enlargement thereof, is desired, without the above-mentioned inconveniences and cost.

Accordingly, a main object of the invention is to provide a novel method, means and apparatus for providing convenient and inexpensive portrait, landscape or other on-site commercial photographs.

Another object is to enable the photographer to provide customer convenience by going to the customer, rather than the customer going to the photographer, which enables the photographer to provide services to many customers at an ideal site for picture taking.

Still another object is to provide a mobile photographic studio having structural features enabling accomplishment of the above objects.

Another main object of the invention is to provide a method of commercially supplying portraits, the method comprising the steps of (a) providing a standard design mobile studio apparatus, (b) arranging and equipping the studio for production line flow of customers and in-process portrait product through the studio, (c) transporting the studio to well publicized and attended events or sites such as fairs, sporting events or scenic tourist attractions, (d) adapting the studio for using the site environment as the natural portrait background and (e) franchising practice of the invention for use of the apparatus and instructions and supervision for making the apparatus and assistance in matters such as financing, promotion and operation of such a business.

Another object is to provide a method and apparatus that enables quality, high-volume, production-line portrait, landscape or other on-site or off-site photography, where the customer can have delivery of a matted, glassed and framed photograph in a matter of minutes, rather than in a matter of days or weeks.

A further object of the invention is to enable inexpensive (as compared to prices that must be charged by a fixed studio) portraits, etc., under circumstances where the customer did not foresee the desire for such portrait, landscape or other photographs.

Another important object of the invention is to provide a means, apparatus and method for use of a wide variety of natural backgrounds, in lieu of the usual backdrops, in portrait photography.

A still further object of the invention is to provide adjustable mirror means positioned behind the portrait subject by which a wide variety of natural backgrounds above, below and to either side of the subject can be reflected to the camera.

These and other objects of the invention, many of which the usual fixed portrait studio cannot accomplish, will become more apparent upon reference to the following specification and the drawings appended thereto.

DETAILED EXPLANATION OF THE INVENTION

Figure 1:
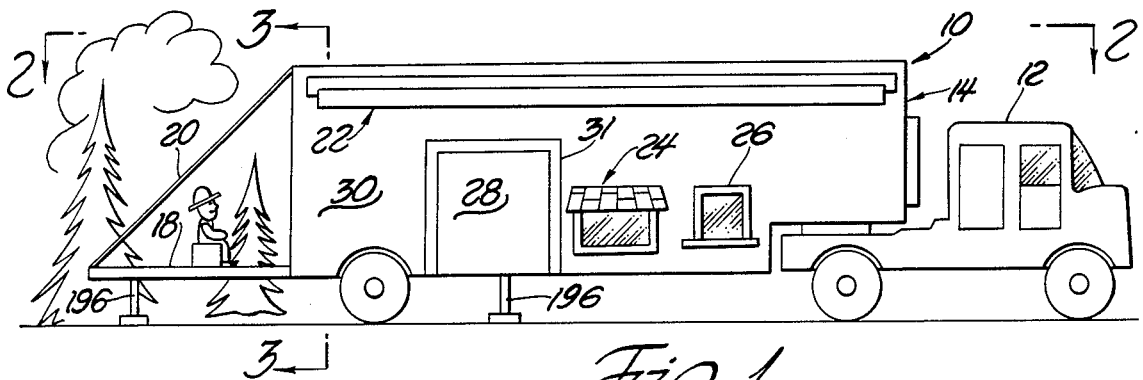
FIG. 1 is a side elevational view of a photographic studio embodying the invention.

Referring now to FIG. 1, studio apparatus 10 embodying the invention includes a truck 12, which may be a ¾ ton pickup truck with a fifth wheel mounted in the bed thereof, and a fifth wheel-equipped trailer 14, the trailer 14 having a skylight 16, a drop end closure wall 18 retained in a horizontal position by wire or other means 20, an extendable and retractable side awning assembly 22, an external unbreakable glass-enclosed and lighted photograph display means 24 and a customer service window means 26. The studio also includes a ramp device 28 formed in the wall 30 of the trailer 14 so as to be capable of being lowered for customer access to the studio and an extendable and retractable accordian-type cover 31 for the ramp adapted, where possible, to be extended to a door 32 in the wall of a building 34, as shown in FIG. 2, for customer protection from the weather.

Figure 2:
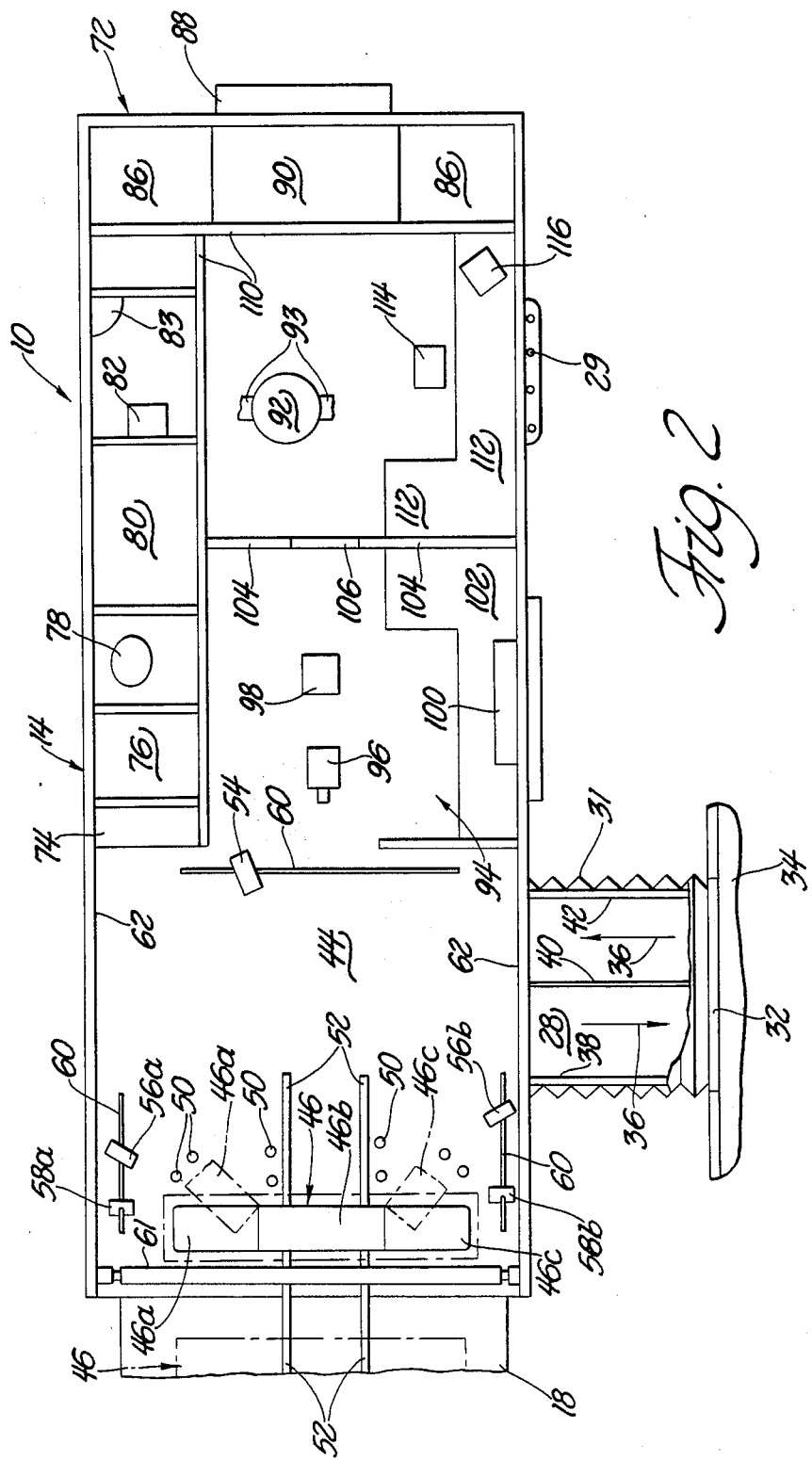
FIG. 2 is an enlarged plan view of the studio shown in FIG. 1, taken on the plane of line 2—2 of FIG. 1, looking in the direction of the arrows.

FIG. 2 is a plan view illustrating a possible interior functional area arrangement of a studio embodying the invention, for purposes of accomplishing the objects thereof.

It is important to recognize that while portrait photographers do make "house calls," for purposes such as church wedding photographs, such house calls involve only a photographer with a camera, who returns to a photographic studio laboratory to develop film, print photographs, submit proofs and then ultimately deliver prints and/or framed pictures, over a substantial period of time, and at substantial prices, as already explained above.

As stated, an object of the invention is to provide the above-mentioned inexpensive, production-line type method of on-site marketing of photographic portraits, which requires that the photographer be at the location where the customer is, with apparatus that enables him to accomplish the objective.

Referring now to FIGS. 1-3, 5 and 6, photographic studio apparatus 10 enabling the objectives of and embodying the invention comprises, in addition to the features referred to in the above brief description of FIG. 1, additional novel combinations of features adapting the same for accomplishment of the objectives of the invention.

More specifically, the studio contemplated by the invention generally comprises functional areas such as customer receiving and seating, camera, utilities, photograph preparation and sales areas or sections, all of which must be arranged in a manner to process customers very quickly. For example, it is contemplated, to successfully accomplish the invention objectives, that the customer should spend no more than three to five minutes in the studio, from the time he enters to the time that he receives and pays for the finished photograph.

The customer area 44 includes the entrance/exit ramp 28 having the traffic direction arrows 36 marked thereon and the handrails 38, 40 and 42 thereon to facilitate safe movement of customers, including handicapped persons in wheel chairs, to and from the customer area 44.

The customer area 44 is centered around the customer seating means 46, which may comprise a suitable padded bench or chair or sectional bench. In the case of a sectional bench, the sections 46a, 46b and 46c may be hinged at 48 so that sections 46a and 46c may be moved to various group seating positions as shown in broken lines in FIG. 2. Any suitable means, such as rods fitting into floor sockets 50, represented by reference numerals, may be provided to lock the sections 46a and 46c in the desired position with respect to section 46b.

Central section 46b may be mounted on tracks 52 so as to be movable thereon to provide further variation in customer seating, in which case similar rods and floor sockets 50 may be provided to anchor section 46b, and additional sets of sockets 50 may be provided to anchor sections 46a and 46c with respect to a different section 46b position. Socket means 50 also anchor the customer seating means against movement during travel. Tracks 52 may be extended across the drop end closure wall 18 so that the seating means may be moved completely out of the customer section 44 if so desired for any reason, such as availability of better lighting or natural background.

The customer section 44 also includes frontal (54), side (56a and 56b) and back (58a and 58b) lighting means, each being adjustably mounted on a track 60 secured to the walls 62 or ceiling 64 of the customer section 44, so as to enable the photographer to provide desired adjustment of the lighting. To hasten lighting adjustment, the lighting means 54, 56 and 58 may be mechanized, as by reversible electric motors, for adjustment from the camera position.

The customer area is, of course, suitably interior decorated, including floor carpeting and the like, and a changeable backdrop means 61 may be mounted between the walls 62 near the ceiling 64.

Figure 3:
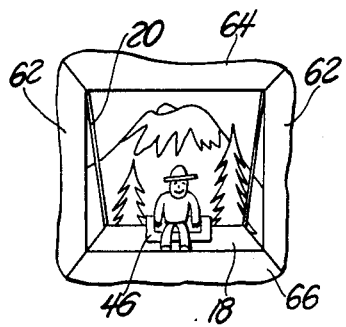
FIG. 3 is a cross-sectional view taken on the plane of line 3—3 of FIG. 1, looking in the direction of the arrows.

Any suitable backdrop structure may be employed, so long as it enables quickly changing the backdrop or moving the backdrop completely out of the way so as to not obstruct the view for a natural background when end closure wall 18 is dropped, as in FIG. 3. Referring to FIG. 6, a possible structure may be, for example, a plurality, a window shade-type backdrop roller mounted panels 65, some of which (as at 65) can be rolled down from the ceiling 64 and attached to the floor 66 and others of which (as at 67) are rolled up from the floor 66 and attached to the ceiling 64. Such a staggered ceiling and floor mounting of the rollers permits a more compact space-saving structure.

In FIG. 3, the backdrop means is shown as comprising three (there may be any desired number with different background colors or scenes) window shade-type roller panels 63 rotatably mounted between a pair of rails 68 each of which is slidably received in one of a pair of cooperating track sections 70 mounted either on the walls 62 or on the ceiling 64. The above structure enables movement of the changeable backdrop structure behind the customer seating means 46, when the latter is moved onto the drop end wall 18 on tracks 52 to adapt the studio to special situations.

Referring again to FIG. 2, the studio comprises a convenience and utilities section 72, which includes a wall-mounted, fold out bed 74, a refrigerator 76, in which food and/or photographic materials (if necessary) may be stored, a water heater 78, a shower 80, a toilet stool 82 and washbowl 83, a cold water storage means 84, gasoline engine-driven electrical generators 86 and generator gasoline tank 88, studio air conditioner 90 and electrical or other studio heater 92, with ducts 93.

The utilities and convenience section 72 permits the studio operating personnel to live in the studio to the extent necessary as the studio is moved from one on-site location to another, where crowds gather for special events such as fairs. Of course, the particular convenience equipment items may be varied, as necessary, to accommodate the particular needs of the studio.

Another section of the studio is the photographer's/operator's work section 94, which includes the suitably mounted camera equipment 96, a photographer's seat 98, possibly a computer 100 and a camera and computer equipment work counter/storage means 102. Of course, there may be more than one camera and camera mounting means (not shown), such as the usual movable tripod, and adjustable ceiling mount, etc.

A wall 104 with a door 106 may separate the section 94 from the customer service section 108, which is preferably separated by walls 110 from the utilities/convenience section 72 and may include a work counter/storage means 112 for sales service activities such as picture final packaging and/or framing, an operator's seat 114, a cash register 116, etc. The seat 114 is adjacent the customer service window 26, through which payment for and delivery of the finished pictures are made.

Of course, the window 26, as well as all other studio ramp, door, skylight and other openings may have bars 29 or other suitable means for securing the same against burglary. Also, means for protecting sales proceeds, studio equipment and materials would be provided to the extent possible.

As stated above, an object of the invention is to provide a method and apparatus for on-site marketing of portraits and photographs, quickly and at competitive prices. To do this, time is of the essence, which includes quickly positioning the customer for the best possible picture.

Figure 4:
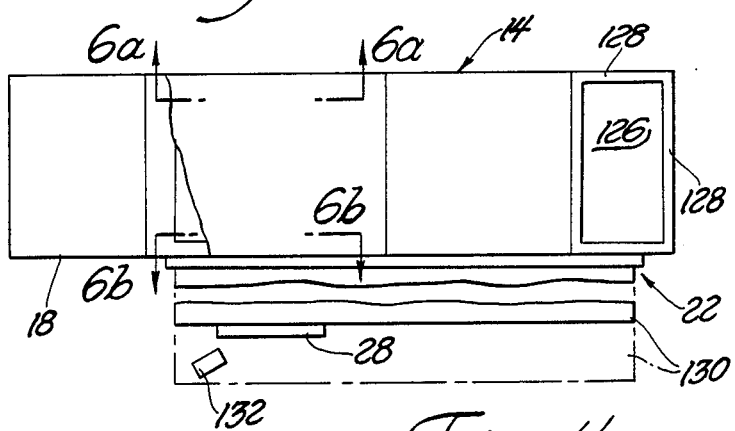
FIG. 4 is a plan view similar to FIG. 2 disclosing a modification of the invention.
Figure 5:
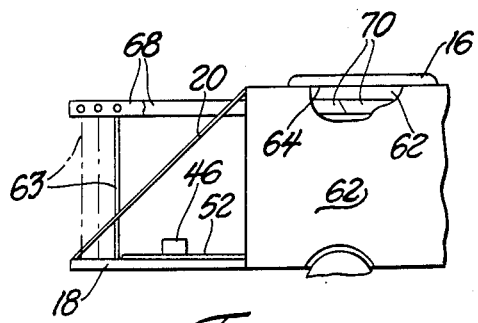
FIG. 5 is a fragmentary portion of FIG. 1, illustrating a modification of the invention.
Figure 6A:
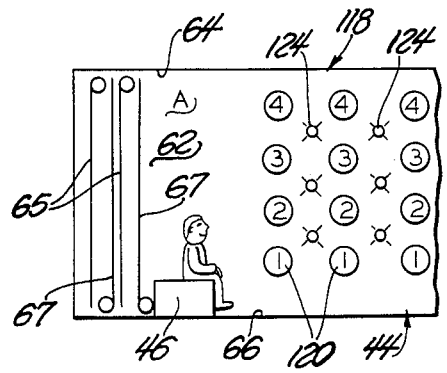
FIG. 6 is a pair of fragmentary views taken on the planes of lines 6—6 and 7—7, respectively, of FIG. 4.
Figure 6B:
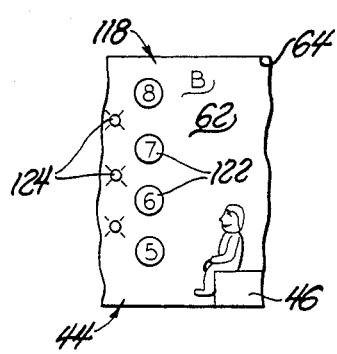

Reference is now made to FIGS. 6a and 6b, which are taken on the plane of lines 6—6 and 7—7 of FIG. 4, which illustrate a time-saving structure that is important to the implementation of the invention. That is, FIGS. 6a and 6b illustrate the provision in the studio, such as on the opposite walls 62 of the customer section 27, of visual means 118 for expediting the positioning of the customer, whether he be a literate adult or a pre-school child that cannot read.

More specifically, means 118 comprises (a) columns 120 of numbers "1"-"4" on one wall 62 and columns 122 of numbers "5"-"8" on the opposite wall 62, for literate customers and (b) blinking lights 124 for pre-school children that cannot respond to directions to look at one of the above-mentioned numbers 120 and 122 of FIGS. 6a and 6b. The numbers 120/122 can be color coded, or they can be lighted. and, in the case of a literate adult customer, the photographer can ask the customer to look at a particular number, such as 4 green, for example. In the case of a small child, the photographer can ask the child to look at a particular blinking light 124 activated by the photographer from his camera position.

FIG. 2 described above is a plan view of a studio that does not require a darkroom for use of a wet developing and printing process. FIG. 4, on the other hand, is a plan view of a studio for a process that does require a darkroom and a wet film developing and printing process, which requires control of wet chemical temperatures. Accordingly, FIG. 4 includes a wet darkroom 126 with temperature-insulated walls 128, which includes the floor and ceiling. Such insulation enhances and reduces the cost of maintaining the required film, chemical and process temperatures.

FIG. 4 also further illustrates the awning assembly 22, which preferably includes a roller-mounted (window shade type) awning panel 130 that can be extended to provide a canopy over an area adjacent the trailer 14 on which a customer reception desk 132 may be provided. The specific structure of the assembly 22 may be varied, the main purpose thereof being to protect the customer reception area from weather conditions such as sun, rain, etc.

The display means 24 comprises a frame having shatter-proof glass in which samples of studio photographs may be displayed. The display may be lighted when the studio is parked on-site overnight, such as at a fair or other similar event, making the studio self-advertising in that respect. For example, a portrait with a site natural background would entice business.

The ramp 28 opening is surrounded by the accordian-type extendable cover 134, which may be used to provide a protected tunnel entrance to the studio from a doorway 32 of a building 34, as explained above. The cover 134 may be used, for example, during rain or snow when the potential customers are attending some function within the building 34 having a door 32 adjacent which the trailer 14 can be parked, possibly overnight for several days.

Figure 7:
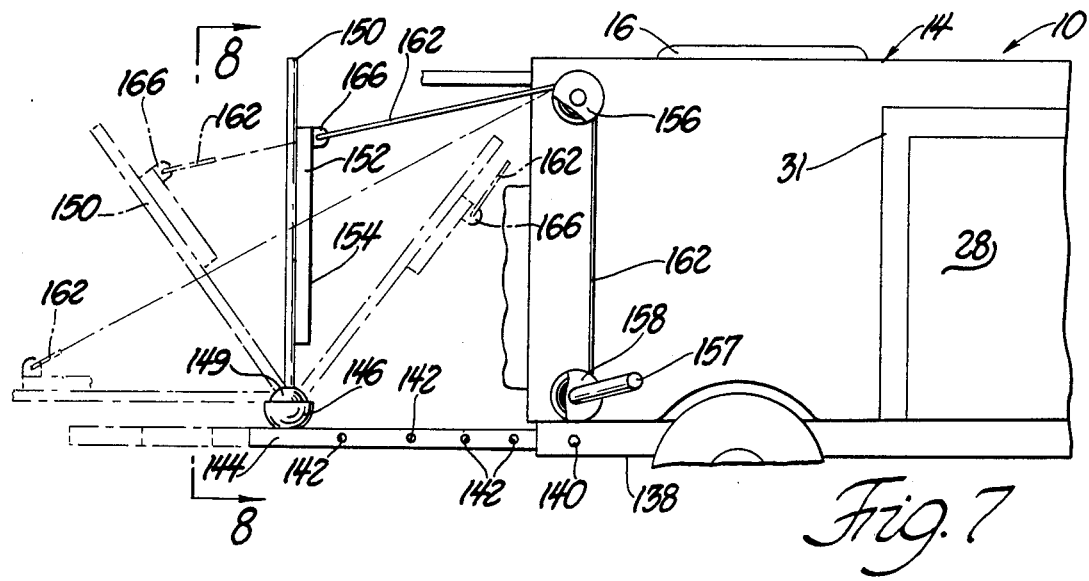
FIG. 7 is a fragmentary side elevational view illustrating another modification of the invention.
Figure 8:
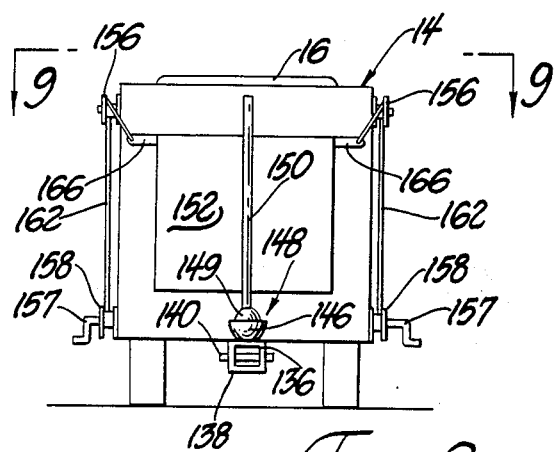
FIG. 8 is an end elevational view taken on the plane of line 8—8 of FIG. 7, looking in the direction of the arrows.
Figure 9:
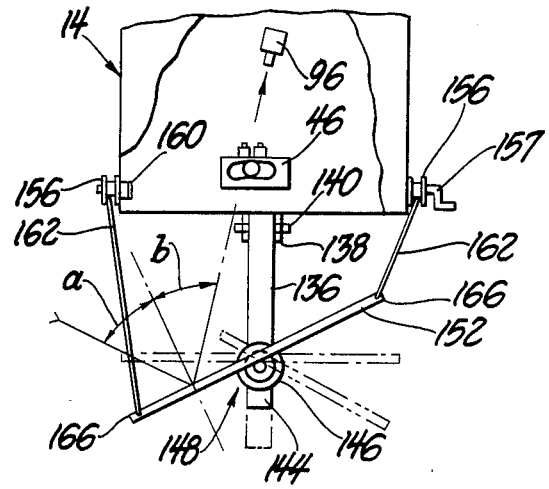
FIG. 9 is a fragmentary top plan view taken on the plane of line 9—9 of FIG. 9, looking in the direction of the arrows.

Reference is now made to FIG. 7 illustrating a rear side portion of the studio trailer 14 and to FIGS. 8 and 9, which are end and top plan views, respectively, of the trailer portion 14 shown in FIG. 1.

Specifically, a rail member 136 is slidably received in a U-shaped stationary track member 138 secured at the bottom longitudinal centerline of the trailer so that the rail 136 can be extended rearwardly to any desired position and locked by any suitable means, such as a removable pin 140 extending through aligned openings 142 in the rail 136 and the track 138.

The outer end 144 of the rail has attached thereto the socket portion 146 of a ball/socket joint 148, the ball 149 received in the socket having a support member 150 secured thereto so as to extend upwardly from the rail. Thus, the support member 150 can be both rotated about its axis and/or swiveled to any desired angular position with respect to the vertical.

A flat mirror 152, having a reflective surface 154 facing the trailer, is fixedly secured in any desired manner to the support member 150, so that the mirror can also be rotated and/or swiveled to any desired angle with respect to the camera 96 mounted in the studio trailer.

Each side of the trailer 14 is fitted with an upper free pulley 156 and a lower spool 158 rotated by means such as the hand crank 157. Of course, the spool 158 could be driven, if so desired, by means such as a reversible electric motor 160 shown in FIG. 9. A suitable chain or wire rope means 162 has one end thereof secured to the spool, on which a sufficient length of the rope is stored, the other end thereof being passed over the pulley and secured to an eye 164 at the adjacent top corner 166 of the mirror 152.

That is, on each side of the trailer, an elongated flexible rope or chain 162 extends from the spool and over the pulley 156 to a corner of the mirror 152 so that the mirror can be adjusted and held in any desired position by proper manipulation of the spools, after the rail 136 is extended to and locked in a desired position.

Suitable alternate means could be employed to position the mirror, such as an arrangement of adjusting rods and clamps and the like (not shown).

The adjustable mirror specially adapts the trailer for use as a mobile studio. Assume, for example, that studio trailer 14 is parked in a limited-space highway scenic view location, such that a lake, a mountain and a river can be seen in three different directions from the trailer, with only the mountain being seen when looking through the opening, such as the open end of the trailer, as in FIG. 3. Assume, further, that the trailer 14 cannot be parked to view the river or the lake through the open end because of the restricted parking space, but that a customer desires a river or lake, rather than the mountain, background.

With the above-described mirror means, the photographer can employ the well-known principle of "angle of incidence equals the angle of reflection" to reflect the river or the lake, or even some other background, such as cloud formations or the moon in the sky, into the camera.

Use of the mirror 152 to reflect a more desirable natural background would be especially useful where the only possible trailer position presents a highly undesirable natural background through the open end thereof, but a much better natural background can be provided by use of the above-described mirror reflection method. Also, "trick" backgrounds can be provided by use of the mirror, and possibly a substitute special or trick mirror. A fixed indoor studio cannot possibly provide such versatility.

When traveling to a site, the mirror is preferably positioned and locked adjacent the closed rear end wall 18 by the rope or other means and protected by a padded cover (not shown) of some kind.

Alternatively, electric or hydraulic control systems, such as those used in manufacturing or construction equipment, could be provided, with push button switch or valve automatic operation of the mirror from the camera location. This would allow the photographer to quickly make precise reflected background adjustments or changes. An electrical drive system 168 is shown schematically in FIG. 10. Any specific electrical and other structural details not shown would be apparent to those skilled in the electrical drive arts, or the hydraulic drive arts if a hydraulic system is desired.

Figure 10:
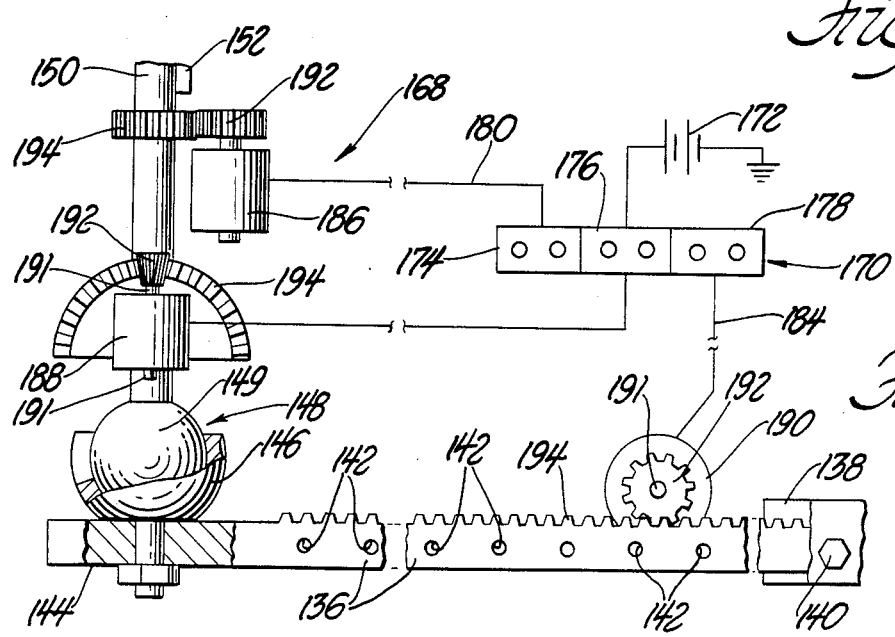
FIG. 10 is a schematic view illustrating still another embodiment of the invention.

Briefly, FIG. 10 discloses a photographer's switch panel 170 located near the camera 96, the panel being connected to a battery 172 and having three sets of two push button switches 174, 176 and 178, each set having appropriate electrical connections 180, 182 and 184 to three electric motors 186, 188 and 190, respectively. Alternatively, the power for the electric motors is supplied by the generators 86, rather than the battery 172.

As stated, the ball and socket joint 148 connects mirror support 150 to the rail 136 in a manner so that the support can both rotate about its axis and swivel, as and for the purposes explained above. Each motor shaft has a drive gear 192 thereon, and each motor gear 192 is connected to drive a mirror control gear 194. That is, motor 186 drives the rail 136 and the joint 148 in or out, motor 188 pivots the mirror support 150 toward or away from the camera and/or sideways and motor 190 rotates the mirror support 150 about its axis.

The detailed structure is such that each adjustment is capable of independent operation, without affecting any other, which would also be the case in a hydraulic or other system. That is, while the operation of motor 188 is independent of motors 186 and 190, the mechanism of motor 188 must be capable of pivoting the mirror support 150 without affecting, or being affected by, the mechanism of motor 190 that rotates the support 150, and vice versa, since they operate differently on the same support member 150.

It may be desirable to provide a central hydraulic pump system or electric motor, with appropriate hydraulic valving, lines and cylinders and/or power take-off, gearing and electric clutches, to operate other studio mechanisms, such as opening and closing the movable wall 18, for mirror operation and/or operation of the chassis jacks 196 (see FIG. 1) to eliminate the vehicle suspension system during photographing sessions. The jack system adapts and enables use of the vehicle, which must have a suspension system to protect delicate camera equipment during travel, for practice of the invention by providing a solid structure needed for photography.

From the specification and drawings, it is apparent that the structural features contemplated by the invention are particularly adapted to accomplish the above stated objectives thereof, which are ideally suited for worldwide franchising under license to practice the invention. Some of these features are as follows:

1. The movable wall of the trailer, enabling the use of the natural outdoor environment (landscapes, sky, buildings, statues, etc.) as the background in portrait photography.
2. The pivoted ramp surrounded by the expandable entrance hallway, by which the studio can be connected to a building doorway to protect customers from weather and to utilize building heat or air conditioning to heat or cool the studio.
3. The adjustable mirror for providing reflected natural backgrounds.
4. Hydraulic jacks stabilizing of the vehicle suspension system.
5. Mobile studio with dry or wet photographic developing.
6. Lighted number method of moving portrait subject (customer) to best profile position.
7. The movable and adjustable customer seating.

While a preferred and other embodiments of the invention have been shown and described, it is apparent that other embodiments within the scope of the invention are possible, and no limitations are intended, except as recited in the appended claims.

What I claim as my invention is:

1. A mobile photographic/portrait studio, said studio comprising a vehicle including a studio chamber enclosure formed by a floor, a ceiling, spaced opposite outer side walls and spaced outer front and rear end walls, said chamber having a plurality of functional areas, one of said areas being the portrait subject seating area, said seating area being disposed adjacent one of said outer walls, at least a portion of said one of said outer walls being movable away from its studio chamber enclosing position, so as to provide a first outer wall opening in said enclosure, whereby the environment outside said studio as seen by the photographer through said first opening provides a natural background for a portrait of the subject and whereby the natural background seen through said first opening can be changed by relocating said vehicle, one of said outer walls having a separate second opening through which studio customers can enter and exit said studio without interfering with use of said first opening for photographic operations.

2. A movable studio such as that recited in claim 1, wherein said movable wall providing said first opening is said rear end wall.

3. A mobile studio such as that recited in claim 1, wherein another one of said functional areas is a photographer's camera operating area including a camera and disposed adjacent said subject seating area and opposite said movable wall providing said first opening, whereby the subject is seated between said camera and said natural background seen through said first opening.

4. A mobile studio such as that recited in claim 3, wherein another of said functional areas is a photographer's work area disposed adjacent said camera operating area on the side thereof opposite said subject seating area, whereby exposed film and/or photographic prints can be conveniently further processed into a finished product such as a matted, glassed and/or framed portrait of the subject without interfering with the photographer's operations in said camera operating area.

5. A mobile studio such as that recited in claim 3, wherein said second customer entrance and exit opening is formed in a portion of one of said side walls that encloses said seating area, at a trailer rear-to-front position between said movable wall first opening and said camera operating area so that customer movement through said studio is available directly to and from said seating area without access to other of said studio areas.

6. A mobile studio such as that recited in claim 4, wherein another of said functional areas is a customer service area disposed adjacent said photographer's work area wherein said finished product is delivered to and paid for by the studio customer, said service area being separated from said work area by wall means and having a customer service window third wall opening for delivery of finished studio products to customers and receiving payment therefor.

7. A mobile studio such as that recited in claim 1, wherein another of said functional areas is a utilities area equipped to provide any desired utilities such as electrical power, heat and/or air conditioning, sanitary facilities, water, food storage, sleeping facilities and the like required for operation of said studio and the comfort and safety of the studio operator.

8. A mobile studio such as that recited in claim 1, wherein said vehicle comprises separate driving and driven vehicle portions, said driven portion comprising a trailer housing said studio chamber, said floor, ceiling and walls of said chamber being the bottom, top and outer peripheral walls of said trailer, and said driving portion comprising a truck connected to said trailer, said truck and trailer having cooperating means for disconnecting said truck from said trailer for more convenient use of said truck as a means of transportation free of said studio trailer.

9. A mobile studio such as that recited in claim 1, wherein mirror means having mirror adjustment means is provided to reflect to said camera, by use of the "angle of reflection is equal to the angle of incidence" principle, a natural background other than the natural background otherwise seen directly through said first opening from said camera.

10. A mobile studio such as that recited in claim 9, wherein said mirror adjustment means comprises power means operable by the camera operator from the camera position in said studio.

11. A mobile studio such as that recited in claim 10, wherein said power means comprises electro-mechanical and/or hydro-mechanical power means.

12. A mobile studio such as that recited in claim 9, wherein said mirror adjustment means comprises a ball-/socket joint-mounted mirror support and separate means to rotate and swivel said support at said joint and to move said joint linearly toward and away from said trailer, each of said means operating independently without being affected by or affecting any other means with respect to mirror adjustment thereby, whereby a substantial number of different mirror positions can be accomplished as needed to reflect the most desirable natural background, which may vary from customer to customer.

13. A mobile studio such as that recited in claim 1, wherein color-coded, numbered and/or selectively-lighted location means are provided on said studio outer side walls visible to the portrait subject, whereby the camera operator can easily and quickly adjust the portrait subject's head and/or body position by directing the subject to face a particular one of said side wall location means.

14. A mobile studio such as that recited in claim 13, wherein said selectively lighted location means are selectively activated from a control switch panel accessible to the camera operator.

15. A mobile studio such as that recited in claim 1, wherein a temperature-insulated wet photographic processing laboratory is provided to facilitate the maintenance therein of temperatures required for wet developing of exposed film and prints.

16. A mobile studio such as that recited in claim 1, wherein a plurality of artificial background panels are mounted for extension to positions behind said subject seating means.

17. A mobile studio such as that recited in claim 16, wherein each of said panels is roller-mounted, said rollers being alternately mounted opposite each other for extension of alternate panels in opposite directions to substantially reduce the roller mounting space, as compared to mounting all of said rollers adjacent one another for extension in the same direction from said rollers.

18. A mobile studio such as that recited in claim 17, wherein said artificial background panels provided in said trailer are roller-mounted on rails extendable over said extended floor provided by said downwardly pivoted rear end wall.

19. A mobile studio such as that recited in claim 1, wherein said movable wall is hingedly connected to said trailer so as to be pivotable downwardly as an extension of said trailer floor, said subject seating means being adjustably mounted on tracks in said trailer floor and said removable wall extension of said floor, whereby said subject seating means can be positioned on said extended floor outside said trailer.

20. A mobile photographic/portrait studio, said studio comprising a vehicle including a studio trailer and a separate truck, said truck and trailer being easily connected and disconnected, as by a fifth wheel mechanism therebetween, said truck being adapted to serve the functions of hauling said trailer and providing convenient transportation for the studio operator when disconnected from said trailer and said trailer being adapted and arranged to provide a convenient and efficient production line-type studio operation by the following general order of functional areas from one end of said studio to the other: portrait subject sitting area, camera operating area, portrait finishing work area, customer service area, said studio having an outer rear wall and connected opposite outer side walls enclosing said sitting area, one of said walls having a portion thereof movable to provide a first opening in said one wall to expose the environment outside said studio for use as a natural portrait background.

21. A mobile studio such as that recited in claim 9, wherein an operator's living convenience area and a studio operating utilities area and equipment are additionally provided.

22. A mobile portrait studio, comprising a wheeled vehicle having a floor, a ceiling and outer opposite side walls and front and rear end walls enclosing a studio chamber, said studio chamber comprising a plurality of functional areas arranged in a particular sequence and equipped to enable an efficient assembly-line type flow of customers and portrait work therethrough from the rear to the front end of said chamber, thereby minimizing the time and cost to deliver framed portrait product to customers, said functional areas comprising, from the rear to the front of said studio, portrait subject sitting, camera operating, portrait framing, customer service, studio utilities and operator convenience areas, said subject sitting area being enclosed by said outer rear wall and side walls, at least a portion of one of said outer walls enclosing said sitting area being hinged at said floor and pivotally movable outwardly to provide a studio floor extension outside of said studio chamber, for portrait subject seating outside said studio chamber, said sitting area having seating means movable from said sitting area floor to said floor extension provided by said movable wall, said movable wall providing when in its floor-extension position forming a first opening to enable use of outside light and the outside environment as a natural portrait background, as in inclement weather, another of said outer walls enclosing said sitting area having another movable wall portion providing a second wall opening providing a customer entrance and exit, whereby customers may enter and exit through said second opening without interfering with use of said first opening for portrait background purposes, said second opening further providing, if desired, a natural background not visible through said first opening.

23. A mobile studio such as that recited in claim 22, wherein a mirror is mounted adjacent said sitting area, said mirror having mounting means arranged to provide independent pivotal and translational movement thereof with respect to said sitting area, to reflect through one of said openings and into said sitting and camera operating areas natural backgrounds not seen from said camera operating area.

24. A mobile studio such as that recited in claim 23, wherein said first opening is in said rear outside wall of said studio chamber so that said vehicle can be backed toward the desired natural background, and wherein said sitting area includes portrait subject seating means, artificial portrait background means and portrait subject posing means, said seating and/or said artificial background means being mounted so as to be movable onto said floor extension outside said studio chamber, said mirror being power operated and said mirror and said portrait posing means being operable by the photographer from said camera operating area, said second opening being formed in one of said outer side walls enclosing said sitting area, said portrait framing area being disposed adjacent said camera operating area on the side thereof opposite said sitting area so that exposed film can be processed and framed in said framing area.

25. A mobile studio such as that recited in claim 22, wherein said customer service area, said operator convenience area and said studio utilities area are located toward said front end of said studio, said customer service area being disposed adjacent said portrait framing area, so that finished portraits can be passed thereto, and along the same outer side wall in which said second customer entrance and exit opening is formed, said customer servie area outer side wall having a third opening disposed on the same side of said studio as said second opening so that customers exiting from said studio can conveniently proceed outside said studio, so as to not interfere with studio operation, to said third opening to receive and pay for their finished portrait.

* * * * *